United States Patent
Suzuki et al.

(10) Patent No.: US 9,381,923 B2
(45) Date of Patent: Jul. 5, 2016

(54) IN-VEHICLE LOAD CONTROL SYSTEM

(71) Applicant: Yazaki Corporation, Tokyo (JP)

(72) Inventors: Masashi Suzuki, Makinohara (JP); Masato Oota, Hamamatsu (JP); Kazuya Suehiro, Hamamatsu (JP)

(73) Assignee: YAZAKI CORPORATION, Tokyo (JP)

( * ) Notice: Subject to any disclaimer, the term of this patent is extended or adjusted under 35 U.S.C. 154(b) by 104 days.

(21) Appl. No.: 14/339,963

(22) Filed: Jul. 24, 2014

(65) Prior Publication Data
US 2015/0032329 A1 Jan. 29, 2015

(30) Foreign Application Priority Data
Jul. 25, 2013 (JP) .................... 2013-154904

(51) Int. Cl.
| | |
|---|---|
| B60W 50/00 | (2006.01) |
| B60Q 1/44 | (2006.01) |
| B60Q 11/00 | (2006.01) |
| B60Q 1/14 | (2006.01) |

(52) U.S. Cl.
CPC .............. *B60W 50/00* (2013.01); *B60Q 1/44* (2013.01); *B60Q 11/00* (2013.01); *B60Q 1/1407* (2013.01); *B60W 2050/0043* (2013.01)

(58) Field of Classification Search
CPC ........ B60Q 1/44; B60Q 1/1407; B60Q 11/00; B60W 2050/0043; B60W 50/00
USPC ............................................. 701/36
See application file for complete search history.

(56) References Cited

U.S. PATENT DOCUMENTS

| | | | | | |
|---|---|---|---|---|---|
| 5,978,352 | A | * | 11/1999 | Imaizumi | B60R 16/0315 307/39 |
| 6,147,967 | A | * | 11/2000 | Ying | G06F 11/2242 370/222 |
| 6,477,140 | B1 | * | 11/2002 | Uda | H04L 12/403 370/216 |
| 7,707,281 | B2 | * | 4/2010 | Baretzki | G06F 11/0709 709/224 |
| 2007/0183161 | A1 | | 8/2007 | Curran | |
| 2012/0280807 | A1 | * | 11/2012 | Kulkarni | H05B 33/0845 340/475 |
| 2013/0151102 | A1 | | 6/2013 | Kim | |

FOREIGN PATENT DOCUMENTS

| | | |
|---|---|---|
| CN | 103144574 A | 6/2013 |
| JP | 9-226451 A | 9/1997 |
| JP | 2000-16174 A | 1/2000 |
| JP | 2011-73507 A | 4/2011 |

OTHER PUBLICATIONS

Communication dated Dec. 31, 2015, from the State Intellectual Property Office of People's Republic of China in counterpart Application No. 201410351112.1.

* cited by examiner

*Primary Examiner* — Khoi Tran
*Assistant Examiner* — Robert Nguyen
(74) *Attorney, Agent, or Firm* — Sughrue Mion, PLLC

(57) ABSTRACT

An in-vehicle load control system configured to controllably drive one or more loads on a vehicle according to an input signal. The system includes a first electronic control portion configured to perform signal processing based on the input signal, and a second electronic control portion configured to controllably drive the load. A backup signal channel is provided independently of a signal channel through which a signal is transmitted in a multiplex communication portion to input the input signal to the second electronic control portion. The second electronic control portion receives a first control signal via the signal channel in the multiplex communication portion and a second control signal via the backup signal channel, and controllably drives the load by preferentially treating the first control signal when the ignition signal is on and by preferentially treating the second control signal when the ignition signal is off.

4 Claims, 3 Drawing Sheets

FIG.3

| DIRECT INPUT FROM EACH SWITCH | | CONTENT OF SIGNAL RECEIVED THROUGH MULTIPLEX COMMUNICATION | CONTROL OUTPUTS OF STOP LAMPS |
|---|---|---|---|
| SW2 | SW1 | | |
| ON | NO RELATION TO OPERATIONS OF STOP LAMPS | TURN-OFF REQUEST C1 | OFF |
| | | TURN-ON REQUEST C2 | ON |
| | | BLINK REQUEST C3 | BLINK |
| OFF | OFF | NO RELATION TO OPERATIONS OF STOP LAMPS | OFF |
| | ON | | ON |

IN-VEHICLE LOAD CONTROL SYSTEM

CROSS REFERENCE TO RELATED APPLICATIONS

This application is based upon and claims the benefit of priority of Japanese Patent Application No. 2013-154904 filed on Jul. 25, 2013, the contents of which are incorporated herein by reference in its entirety.

BACKGROUND OF THE INVENTION

1. Field of the Invention

The present invention relates to an in-vehicle load control system, and more particularly, to a system for controlling a load (e.g., a load such as a stop lamp) mounted on a vehicle.

2. Description of the Related Art

In a vehicle, various types of loads are provided, which can be controlled by signals from a switch and a sensor. Loads, e.g., lamps such as a stop lamp (brake lamp), a headlamp and a tail lamp, various motors, a solenoid, and a heater are located dispersedly in various locations on a vehicle. Various switches and sensors for outputting signals to operate those loads are also located dispersedly in various locations on the vehicle.

In a vehicle, loads placed at various locations on the vehicle are connected to one another using wire harnesses, so that each of the loads can be controlled by signals from a switch, a sensor, and so on. The wire harness is configured by bundling a lot of wires such as electric wires.

Further, generally, the wire harness is configured so that the turning-on/off of a single load can be operated by a signal from a single switch or sensor. Accordingly, if the numbers of switches and loads to be mounted on a vehicle are increased, it is necessary to transmit each of signals through the wire harness. Thus, the number of wires configuring a wire harness is vast.

Moreover, e.g., if a switch is placed at a front portion of a vehicle, whereas a load to be controlled is placed at a rear portion thereof, a signal should be transferred over a relatively long distance. Accordingly, the overall length of a wire harness is long, and the weight thereof increases.

Thus, in order to reduce the number and the weight of electric wires configuring a wire harness, as disclosed in JP-A-9-226451, it is conducted to transmit a signal from a switch or the like by multiplex communication. JP-A-9-226451 also discloses that a backup signal line is provided in addition to a multiplex communication channel such that even if a malfunction or a trouble occurs in a signal multiplex communication system, a load can be controlled by a signal from a manual switch.

Moreover, JP-A-2000-16174 discloses a technique for driving, when the breaking of a lamp is detected, an alternate lamp as a backup in the case of braking an important lamp such as a turn signal lamp or a stop lamp.

Incidentally, the term "multiplex communication" means "transmitting plural types of signals or information using a single signal line".

SUMMARY OF THE INVENTION

It is desirable to employ, e.g., the techniques disclosed in JP-A-9-226451 and JP-A-2000-16174 to provide a control system for an important lamp, such as a turn signal lamp and a stop lamp, with a backup function such that each important lamp is surely turned on, if necessary even when a malfunction or a trouble occurs.

Incidentally, it is considered that a control system for a load of special importance does not utilize a multiplex communication channel but utilizes only a backup channel to transmit a signal. However, e.g., each stop lamp of a recent vehicle cannot implement necessary functions using only a backup channel, because the functions of a switch are diversified.

For example, one of the recent stop lamps has a special function of automatically causing, when braking suddenly, all stop lamps to blink to alert a following vehicle thereby to reduce the possibility of being rear-ended. In order to implement such a function, it is necessary to perform special processing for monitoring the state of a switch linked with the pressed state of a brake pedal (e.g., monitoring a turn-on/off speed) or to identify whether a special condition is met. Thus, an electronic control unit (ECU) should be used to process a signal from the switch. Accordingly, the multiplex communication channel is needed in addition to the backup channel.

On the other hand, an in-vehicle load control system having both of the above multiplex channel and the above backup channel has the following problems.

That is, it is necessary that the in-vehicle control system is provided with each of an input-side electronic control unit which monitors signals from the switch and sends a result of monitoring via the multiplex communication channel, and an output-side electronic control unit which controls loads such as a stop lamp based on a signal received from the multiplex communication channel. It is desirable that the electronic control units are always in a condition in which signal monitoring and data communication can be performed. Thus, even when an electric-generator on a vehicle does not operate, the system cannot reduce power consumption.

Further, when some trouble occurs in the multiplex communication channel, it is necessary to correctly diagnose whether this trouble is a continual problem such as the breaking and the malfunction. A relatively long time is needed to diagnose. Moreover, if the electronic control unit at the transmission-side of multiplex communication is in a sleep state, the electronic control unit at the reception side of multiplex communication should distinguish whether a signal unreceivable state lasts for a time-period equal to or longer than a predetermined time. It takes time to obtain a diagnostic result. Thus, when a trouble actually occurs, a time-lag since then to the succession of control by changing the multiplex communication channel to the backup channel is generated by the influence of the delay of diagnosis processing. That is, although the backup channel exists, sometimes, the speed of a response since a driver presses a brake pedal until each stop lamp is actually turned on is low.

The present invention is accomplished according to the above circumstances. A non-limited object of the present invention is to provide an in-vehicle load control system capable of reducing consumed electric-power of an electronic control unit and suppressing the reduction of a response speed of an operation of a load to an input signal.

In order to achieve the above object, an in-vehicle load control system according to the present invention has some aspects in the following configurations (1) to (4).

(1) An in-vehicle load control system configured to controllably drive one or more loads on a vehicle according to an input signal output by an operating switch or a sensor on the vehicle, the in-vehicle load control system including:

a first electronic control portion configured to perform signal processing based on the input signal;

a second electronic control portion configured to controllably drive the load;

a multiplex communication portion configured to enable multiplex communication of information between the first electronic control portion and the second electronic control portion; and a backup signal channel independent of a signal channel through which a signal is transmitted in the multiplex communication portion, and configured to input the input signal to the second electronic control portion, wherein the second electronic control portion is configured to refer to a state of an ignition signal of the vehicle; and the second electronic control portion receives a first control signal via the signal channel in the multiplex communication portion and a second control signal via the backup signal channel, and controllably drives the load by preferentially treating the first control signal when the ignition signal is on and by preferentially treating the second control signal when the ignition signal is off.

(2) The in-vehicle load control system according to the configuration (1), wherein the operating switch includes a stop lamp switch configured to operate in response to pressing of a brake pedal of the vehicle, and the load includes a stop lamp configured to be turned on in response to the pressing of the brake pedal of the vehicle.

(3) The in-vehicle load control system according to the configuration (2), wherein the first electronic control portion includes a microcomputer capable of being brought into a sleep state in which power consumption is reduced when a predetermined condition is met.

(4) The in-vehicle load control system according to the configuration (3), wherein the microcomputer of the first electronic control portion is brought into the sleep state when the ignition signal is off.

According to the in-vehicle load control system having the above configuration (1), the second control signal is preferentially treated when the ignition signal is off. Thus, it is unnecessary to transmit the first control signal going through the signal channel of the multiplex communication portion. At that time, the consumed electric-power of the first electronic control portion can be suppressed. In addition, the second electronic control portion can process the second control signal without diagnosing the first control signal going through the signal channel of the multiplex communication portion. Thus, the reduction of the response speed can be suppressed. Further, the first control signal is preferentially treated when the ignition signal is on. Thus, a special operation such as the automatic blinking of the stop lamps can be performed.

According to the in-vehicle load control system having the above configuration (2), each stop lamp can be controlled, based on a signal from the associated stop lamp switch. The stop lamps are very important when the vehicle is driven. Even when the ignition signal is off, each stop lamp can surely be turned on. In addition, the reduction of the response speed can be suppressed.

According to the in-vehicle load control system having the above configuration (3), e.g., when the ignition signal is off, an operation of transmitting a signal through the signal channel of the multiplex communication portion can be omitted. Thus, the power consumption can be reduced by bringing the microcomputer into a sleep state.

According to the in-vehicle load control system having the above configuration (4), when the ignition signal is off, the microcomputer of the first electronic control portion is brought into a sleep state. Thus, the electric-power consumption can be reduced when the electric-generator on the vehicle does not operate.

In accordance with the in-vehicle load control system according to the present invention, the electric-power consumption of the electronic control unit can be reduced. In addition, the reduction of the response speed of an operation of the load to an input signal can be suppressed. Accordingly, a function useful in controlling the load such as the stop lamp can be provided.

In the foregoing description, the present invention has briefly been described. However, details of the present invention will be further clarified by reading thorough the following description of embodiments with reference to the accompanying drawings.

BRIEF DESCRIPTION OF THE DRAWINGS

In the accompanying drawings:

FIG. 3 is a schematic diagram illustrating a list that shows a correspondence relationship between the input signals to and the outputs from the in-vehicle electronic control unit (ECU2) of the in-vehicle load control system according to the embodiment of the present invention.

DETAILED DESCRIPTION OF THE EXEMPLARY EMBODIMENTS

Hereinafter, a practical embodiment of an in-vehicle load control system according to the present invention is described with reference to the accompanying-drawings.

<System Configuration Example>
<Description of Entire System>

Figure 1:
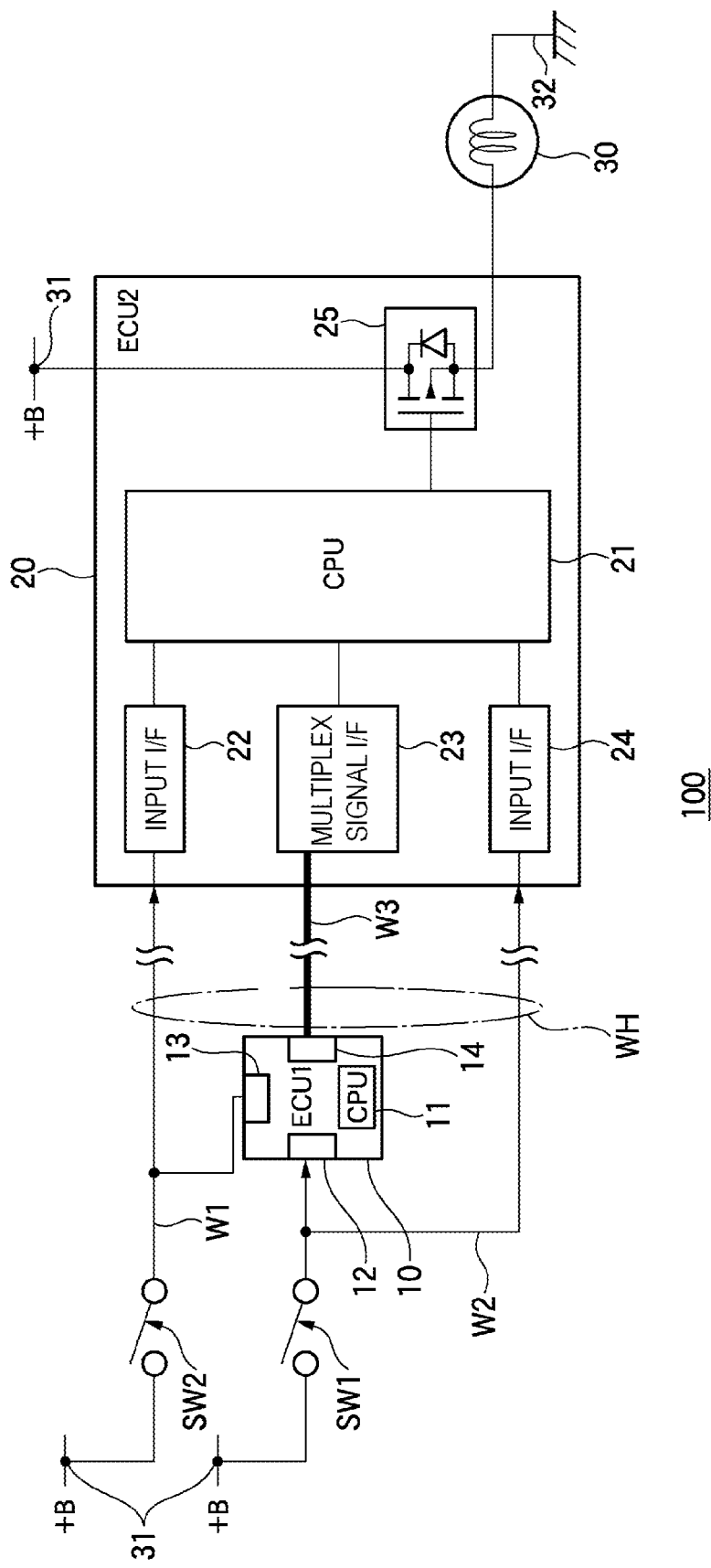
FIG. 1 is a block diagram illustrating a configuration example of an in-vehicle load control system according to an embodiment of the present invention.

FIG. 1 illustrates a configuration example of an in-vehicle control system 100 according to the present embodiment.

The in-vehicle load control system 100 illustrated in FIG. 1 includes an in-vehicle electronic control unit (ECU1) 10, and an in-vehicle electronic control unit (ECU2) 20 as major components. Reasons for using plural in-vehicle electronic control units are not only the intention of causing the in-vehicle electronic control units to share functions, but the intention of reducing the weight of the wire harness WH, and the number of electric wires configuring the wire harness WH.

In the in-vehicle load control system 100 illustrated in FIG. 1, the in-vehicle electronic control unit (ECU1) 10 is placed around a driver's seat at a vehicle body front portion. That is, the in-vehicle electronic control unit (ECU1) 10 can be utilized for processing signals from various switches located near the driver's seat and controlling various loads located near there.

Further, the in-vehicle electronic control unit (ECU2) 20 is placed at a vehicle body rear portion. That is, the in-vehicle electronic control unit (ECU2) 20 can be utilized for controlling various loads such as the stop lamps, the tail lamps, and the winker lamps placed at a vehicle rear portion, and processing signals output by various sensors.

Accordingly, the in-vehicle electronic control units (ECU1 and ECU2) 10 and 20 are away from each other by a distance of about several meters. As illustrated in FIG. 1, the in-vehicle electronic control units (ECU1 and ECU2) 10 and 20 are connected to each other via the wire harness WH.

The wire harness WH illustrated in FIG. 1 includes signal lines W1 and W2, and a local area network (LAN) cable W3. Multiplex communication is performed between the in-vehicle electronic control units (ECU1 and ECU2) 10 and 20 to transmit various information. In this multiplex communication, a channel configured by the LAN cable W3 is utilized. That is, various types of information are transmitted using multiplex communication. Consequently, the number of electric wires configuring the wire harness WH can be decreased, and the weight of the wire harness WH can be reduced. Especially, if the distance between the in-vehicle electronic control units (ECU1 and ECU2) 10 and 20 is large, the weight of the wire harness WH can effectively be reduced.

In the in-vehicle electronic control unit 100 illustrated in FIG. 1, a case is assumed, in which a stop lamp 30 serving as a major control target load is controlled, based on an input signal from a stop lamp switch SW1. The stop lamp switch SW1 is a switch configured such that the on/off state of electric contacts is changed in response to the pressing of the brake pedal. That is, when the brake pedal is not pressed, the switch SW1 is off. If the brake pedal is pressed by an amount that is equal to or more than a predetermined value, the switch SW1 is on.

The stop lamp switch SW1 is located near the driver's seat. Thus, the stop lamp switch SW1 is connected to the in-vehicle electronic control unit (ECU1) 10 placed at a position close to the switch SW1. Moreover, the ignition (IG) switch SW2 located near the driver's seat is also connected to the in-vehicle electronic control unit (ECU1) 10. For example, the ignition switch SW2 is on when an engine runs, whereas the ignition switch SW2 is off when the engine stops. In addition, when the engine stops, the electric-generator also runs.

Signals from the stop lamp switch SW1 and the ignition switch SW2 can also transmit information via the LAN cable W3 to the in-vehicle electronic control unit (ECU2) 20 utilizing the multiplex communication function of the in-vehicle electronic control unit (ECU1) 10. However, the signals from the switches SW1 and SW2 are very important and thus need the backup signal channel. Thus, as illustrated in FIG. 1, the stop lamp switch SW1 and the ignition switch SW2 are connected to input to the in-vehicle electronic unit (ECU2) 20 via the signal lines W2 and W1, respectively.

<Description of In-vehicle Electronic Unit (ECU1) 10>

The in-vehicle electronic unit (ECU?) 10 illustrated in FIG. 1 includes a microcomputer (central processing unit (CPU)) 11, input interfaces (I/Fs) 12 and 13, and a multiplex signal interface 14.

The microcomputer 11 implements functions needed to control the in-vehicle electronic control unit (ECU1) 10, by running a program preliminarily built in the microcomputer 11. The input interface (I/F) 12 gives the microcomputer 11 an electric signal output by the stop lamp switch SW1 after shaping or converting the electric signal into a signal suitable for processing performed by the microcomputer 11. The input interface 13 gives the microcomputer 11 an electric signal output by the ignition switch SW2 after shaping or converting the electric signal into a signal suitable for the processing performed by the microcomputer 11.

The multiplex signal interface 14 provides a communication function for multiplexing plural types of signals and information and transmitting the multiplexed signals and information. More specifically, the multiplex signal interface 14 performs data communication control that meets the standards of an in-vehicle LAN. The multiplex signal interface 14 is electrically connected to the in-vehicle electronic control unit (ECU2) 20 via the LAN cable W3.

<Description of In-vehicle Electronic Control Unit (ECU2) 20>

The in-vehicle electronic control unit (ECU2) 20 illustrated in FIG. 1 includes a microcomputer 21, input interfaces (I/F) 22 and 24, a multiplex signal interface 23, and a switching device 25.

The microcomputer 21 implements functions needed to control the in-vehicle electronic control unit (ECU2) 20, by running a program preliminarily built in the microcomputer 21. The input interface (I/F) 22 gives the microcomputer 21 an electric signal output by the ignition switch SW2 after shaping or converting the electric signal into a signal suitable for processing performed by the microcomputer 21. The input interface 24 inputs an electric signal output by the stop lamp switch SW1 via the signal line W2, and after shaping or converting the electric signal into a signal suitable for the processing performed by the microcomputer 21 give a shaped or converted electric signal to the microcomputer 21.

The multiplex signal interface 23 provides a communication function for multiplexing plural types of signals and information and transmitting the multiplexed signals and information. More specifically, the multiplex signal interface 23 performs data communication control that meets the standards of an in-vehicle LAN. The multiplex signal interface 23 is electrically connected to the in-vehicle electronic control unit (ECU1) 10 via the LAN cable W3. The microcomputer 21 switches the on/off of the switching device 25, based on a control signal received via the multiplex signal interface 23 from the in-vehicle electronic control unit (ECU1) 10. Consequently, the microcomputer 21 controllably drives the stop lamp 30.

The switching device 25 is configured by a metal-oxide semiconductor (MOS) type transistor (field effect transistor (FET)). The switching device 25 can switch the on/off of the energization of a load according to a signal output by the microcomputer 21.

In the example illustrated in FIG. 1, the switching device 25 is connected to a power-supply line (e.g., a +12-volts (V) line) 31 at one terminal thereof and to one terminal of the stop lamp 30 at the other terminal thereof. The other terminal of the stop lamp 30 is connected to a grounding line 32. Accordingly, when the switching device 25 is on (i.e., in an electrically-conductive state), electric-current flows from the power-supply line 31 to the grounding line 32 via the switching device 25 and the stop lamp 30. Thus, the stop lamp 30 is turned on. Further, when the switching device 25 is off, no electric-current flows into the stop lamp 30. Thus, the stop lamp 30 is in a turn-off state.

<Operation of In-vehicle Load Control System 100>
<Operation of In-vehicle Electronic Control Unit (ECU1) 10>

The in-vehicle electronic control unit (ECU1) 10 included in the in-vehicle load control system 100 illustrated in FIG. 1 can perform various control-operations on various types of devices on the vehicle. The in-vehicle electronic control unit (ECU1) 10 according to this embodiment processes signals from the stop switch SW1 and the ignition switch SW2 and outputs control signals to the in-vehicle electronic control unit (ECU2) 20. Apparently, the in-vehicle electronic control unit (ECU1) 10 can monitor outputs of switches and sensors other than the switches SW1 and SW2, and output signals to a control unit other than the in-vehicle electronic control unit (ECU2) 20. When processing signals from the stop lamp switch SW1 and the ignition switch SW2, the microcomputer 11 of the in-vehicle electronic control unit (ECU1) 10 monitors signals from the stop lamp switch SW1 and the ignition switch SW2 and perceives the situation of an own vehicle.

On the other hand, the in-vehicle electronic control unit (ECU2) 20 receives control signals from the in-vehicle electronic control unit (ECU1) 10 via the multiplex communication channel. Thus, the in-vehicle electronic control unit (ECU2) 20 controllably drives the stop lamp 30.

More specifically, the in-vehicle electronic control unit (ECU1) 10 identifies at least a turn-off request C1, a turn-on request C2, and a blink request C3, based on the state of a signal output by the stop lamp switch SW1. That is, if the signal from the switch SW1 is on in a state in which a special condition preliminarily determined is met, the in-vehicle electronic control unit (ECU1) 10 identifies this signal as a blink request C3. If the signal from the switch SW1 is on in a state other than the state corresponding to the blink request C3, the in-vehicle electronic control unit (ECU1) 10 identifies this signal as a turn-on request C2. If the signal from the switch SW1 is off in a state other than the state corresponding to the blink request C3, the in-vehicle electronic control unit (ECU1) 10 identifies this signal as a turn-off request C1.

Then, the microcomputer 11 of the in-vehicle electronic control unit (ECU1) 10 sends to the in-vehicle electronic control unit (ECU2) 20 information which corresponds to one of the turn-off request C1, the turn-on request C2, and the blink request C3 and represents the latest state, by multiplex communication utilizing the multiplex signal interface 14, e.g., periodically or when change of the state is detected.

Further, in the in-vehicle electronic control unit (ECU1) 10 according to this embodiment, the microcomputer 11 monitors the state of the ignition switch SW2. When the microcomputer 11 detects that the state of the switch SW2 is changed into an ignition-off state, the microcomputer 11 is automatically brought into a sleep state. When the microcomputer 11 is in the sleep state, an operation of the microcomputer 11 almost stops. Thus, the power consumption of the microcomputer 11 is very small. Further, if the state of the switch SW2 is changed into an ignition-on, the microcomputer 11 performs a wake-up, so that the state of the microcomputer 11 returns to a normal operation from the sleep state.

<Operation of In-vehicle Electronic Control Unit (ECU2) 20>

Figure 2:
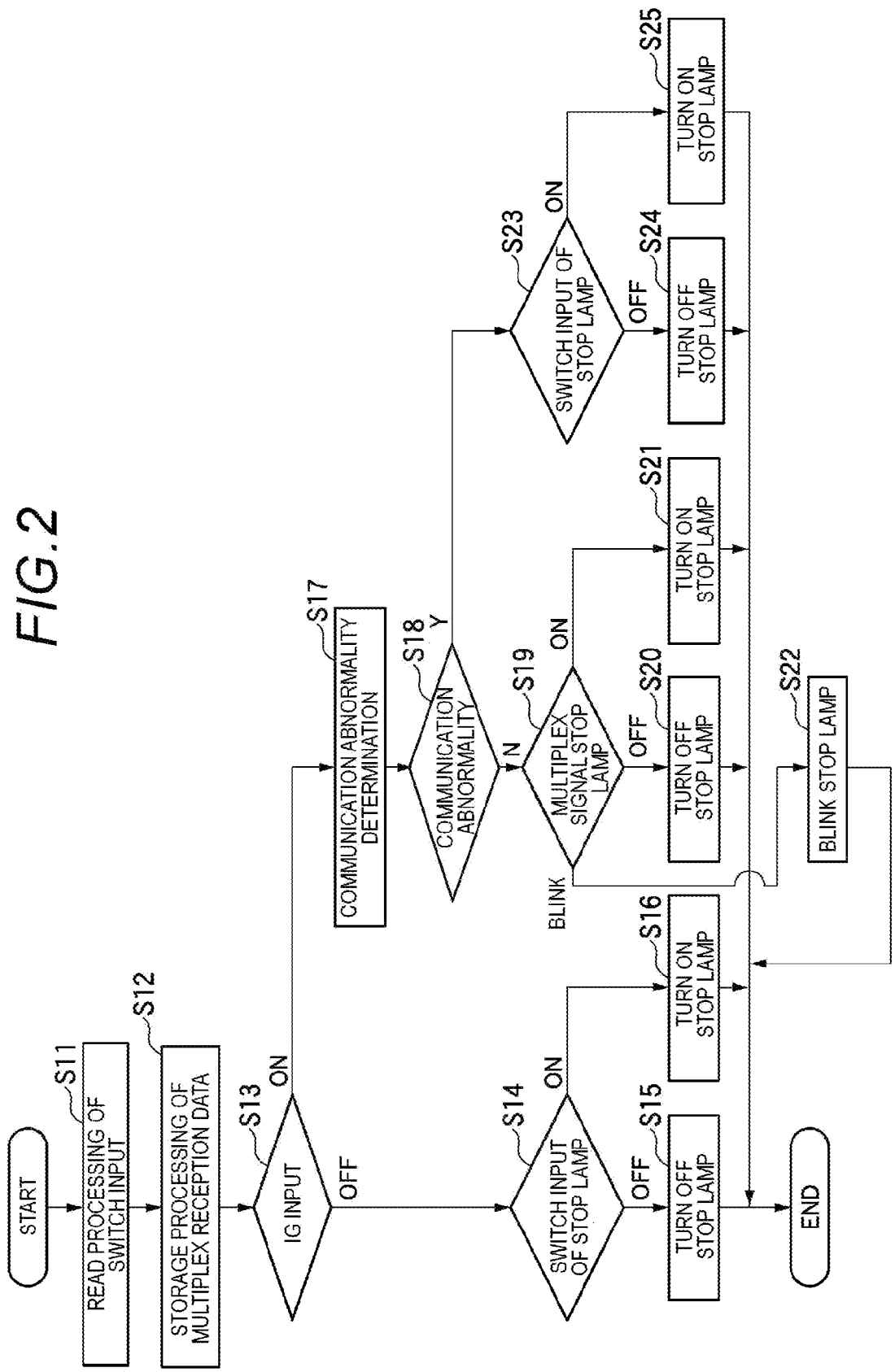
FIG. 2 is a flowchart illustrating a major operation of an in-vehicle electronic control unit (ECU2) of the in-vehicle load control system according to the embodiment of the present invention.

FIG. 2 illustrates a major operation of the in-vehicle electronic control unit (ECU2). Further, FIG. 3 illustrates a list showing the correspondence relation between the input signal to and the output of the in-vehicle electronic control unit (ECU2). That is, the microcomputer 21 of the in-vehicle electronic control unit (ECU2) 20 performs a process illustrated in FIG. 2. Thus, a function meeting the specification of an operation illustrated in FIG. 3 can be implemented. The process illustrated in FIG. 2 is described hereinafter.

In step S11, the microcomputer 21 reads the state of a signal input from each of the switches (SW1 and SW2) by referring to the outputs of the input interfaces 22 and 24.

In step S12, the microcomputer 21 causes a predetermined memory to temporarily store information received as a multiplex signal by the multiplex signal interface 23 from the in-vehicle electronic control unit (ECU1) 10.

In step S13, the microcomputer 21 distinguishes the on-state and the off-state of the signal from the ignition switch SW2, among the signals read in step S11. If the signal from the ignition switch SW2 is on, the process proceeds to step S17. If the signal from the ignition switch SW2 is off, the process proceeds to step S14.

In step S14, the microcomputer 21 distinguishes the on-state and the off-state of the signal output by the stop lamp switch SW1, among the signals read in step S11. If the signal from the stop lamp switch SW1 is on, the process proceeds to step S16. If the signal from the stop lamp switch SW1 is off, the process proceeds to step S15.

In step S15, the microcomputer 21 controls the switching device 25 to be off thereby to change the state of the stop lamp 30 into a turn-off state. That is, in the case where the ignition-switch is off, if the signal from the stop lamp switch SW1 is off, the microcomputer 21 immediately turns off the stop lamp 30. An operation in this case has no relation to the multiplex signal received in step S12. Thus, diagnosis processing on the multiplex signal is not performed.

In step S16, the microcomputer 21 controls the switching device 25 to be on thereby to change the state of the stop lamp 30 into a turn-on state. That is, in the case where the ignition-switch is off, if the signal from the stop lamp switch SW1 is on (i.e., corresponds to a state in which the brake pedal is pressed), the microcomputer 21 immediately turns on the stop lamp 30. An operation in this case has no relation to the multiplex signal received in step S12. Thus, diagnosis processing on the multiplex signal is not performed.

In step S17, the microcomputer 21 performs diagnosis on a multiplex communication operation of the multiplex signal interface 23. That is, diagnosis is performed to check whether the content of the multiplex signal received in step S12 is reliable. For example, it is checked whether the communication between the multiplex signal interface 23 and the counterpart multiplex signal interface 14 is lost for a predetermined time or longer. It is also checked whether the received data includes abnormal data. In addition, it is checked whether a communication error occurs. Therefore, a certain amount of time is necessary for the diagnosis processing in step S17. It is inevitable that a certain delay occurs since the multiplex signal is received in step S12 until the process proceeds to step S18.

In step S18, the microcomputer 21 distinguishes a result of the diagnosis in step S17. If there is communication abnormality, the process proceeds to step S23. If there is no communication abnormality, the process proceeds to step S19.

In step S19, the microcomputer 21 discriminates the contents of instructions relating to the control of the stop lamp 30 in information included by the multiplex signal received in step S12. That is, in step S19, the microcomputer 21 identifies which of the turn-off request C1, the turn-on request C2, and the blink request C3 illustrated in FIG. 3 is received last. If the turn-off request C1 is received last, the process proceeds to step S20. If the turn-on request C2 is received last, the process proceeds to step S21. If the blink request C3 is received last, the process proceeds to step S22.

In step S20, the microcomputer 21 controls the switching device 25 to off to thereby change the state of the stop lamp 30 into a turn-off state. That is, in the case where the ignition-switch is on, and where there is no abnormality in a result of diagnosis on the multiplex communication, the microcomputer 21 turns off the stop lamp 30 according to the content of the received multiplex signal when the stop lamp switch SW1 is off.

In step S21, the microcomputer 21 controls the switching device 25 to on to thereby change the state of the stop lamp 30 into a turn-on state. That is, in the case where the ignition-switch is on, and where there is no abnormality in a result of diagnosis on the multiplex communication, the microcomputer 21 turns on the stop lamp 30 according to the content of the received multiplex signal when the stop lamp switch SW1 is on.

In step S22, the microcomputer 21 controls the stop lamp 30 to a blink state by periodically repeating the on and off of a control signal to be given to the switching device 25. That is, in the case where the ignition-switch is on, and where there is no abnormality in a result of diagnosis on multiplex communication, if the blink request C3 is sent from the in-vehicle electronic control unit (ECU2) 20, the microcomputer 21 blinks the stop lamp 30 according to the blink request C3 represented by the received multiplex signal.

In step S23, the microcomputer 21 distinguishes the on-state and the off-state of the signal from the stop lamp switch SW1, among the signals read in step S11. If the signal from the stop lamp switch SW1 is on, the process proceeds to step S25. If the signal from the stop lamp switch SW1 is off, the process proceeds to step S24.

In step S24, the microcomputer 21 controls the switching device 25 to off thereby to change the state of the stop lamp 30 into a turn-off state. That is, in the case where the ignition-switch is on, and where abnormality of multiplex communication is detected, a signal input to the input interface 24 of the in-vehicle electronic control unit (ECU2) 20 directly from the backup channel is preferentially treated. If the signal from the stop lamp switch SW1 is off, the microcomputer 21 turns off the stop lamp 30.

In step S25, the microcomputer 21 controls the switching device 25 to on thereby to change the state of the stop lamp 30 into a turn-on state. That is, in the case where the ignition-switch is on, and where abnormality of multiplex communication is detected, a signal input to the input interface 24 of the in-vehicle electronic control unit (ECU2) 20 directly from the backup channel is preferentially treated. If the signal from the stop lamp switch SW1 is on (i.e., corresponds to a state in which the brake pedal is pressed), the microcomputer 21 turns on the stop lamp 30.

<Summary of Operation of In-vehicle Load Control System 100>
<If Switch SW2 Is Off>

That is, as the content illustrated in FIG. 3 indicates, if the signal from the ignition switch SW2 is off, the in-vehicle electronic control unit (ECU2) 20 preferentially treats a signal from the switch SW1, which is input directly to the input interface 24. The in-vehicle electronic control unit (ECU2) 20 controls the turn-on/turn-off of the stop lamp 30 according to this signal. The control-operation in this case does not involve diagnosis processing on multiplex communication. Thus, the stop lamp 30 can be controlled without generating a delay.

Further, in this case, the in-vehicle electronic control unit (ECU2) 20 preferentially treats a signal from the switch SW1, which is input directly to the unit 20. Thus, the in-vehicle electronic control unit (ECU1) 10 needs neither to transmit a signal from the switch SW1 through multiplex communication nor to monitor signals from the switch SW1. Thus, if the in-vehicle electronic control unit (ECU1) 10 is brought into a sleep state when the ignition-switch is off, there is no obstacle to an operation of the entire system. Accordingly, the microcomputer 11 is brought into a sleep state, so that the power consumption can be reduced.

<If Switch SW2 Is On>

As the content illustrated in FIG. 3 indicates, if the signal from the ignition switch SW2 is on, the in-vehicle electronic control unit (ECU2) 20 preferentially treats a signal received through multiplex communication in comparison with a signal input directly to the input interface 24 from the switch SW1. The in-vehicle electronic control unit (ECU2) 20 controls the turn-on/turn-off and the blinking of the stop lamp 30 according to the signal received through multiplex communication. Thus, if the ignition-switch is on, a special function, such as the blinking of the stop lamp 30, can be implemented.

When the signal received through multiplex communication is preferentially treated, the control-operation involves diagnosis processing on multiplex communication. Thus, there is a possibility of occurrence of a certain delay of the control-operation. However, when the signal from the ignition switch SW2 is on, there is a high possibility that the electric-generator of the vehicle runs. Thus, the in-vehicle electronic control unit (ECU1) 10 does not need to be brought into a sleep state. The multiplex communication can be maintained in an appropriate state by always monitoring the state thereof. A time needed for diagnosis processing on multiplex communication (in step S17) can be reduced.

<Possibility of Modification>

According to the above embodiment, the stop lamp 30 serving as a load is controlled according to a signal from the stop lamp switch SW1 that operates in association with the pressing state of the brake pedal. However, the in-vehicle load control system 100 can be utilized for controlling various types of loads other than the stop lamp 30. Moreover, it is considered that signals output by various types of switches and sensors other than the signals from the stop lamp switch SW1 are utilized. For example, the following combinations can be cited.

An in-vehicle load control system 100 that controls the driving of a vehicle interior illuminating lamp (equivalent to a load), based on a signal from a sensor (corresponding to the switch SW1) for detecting the opening/closing of each door of a vehicle.

An in-vehicle load control system 100 that controls the driving of a motor (equivalent to a load) for causing a window of a vehicle to slide vertically, based on a signal from a switch (corresponding to the switch SW1) for operating the opening/closing of the window of the vehicle.

An in-vehicle load control system 100 that controls the driving of a motor (equivalent to a load) for laterally moving each wiper (equivalent to a load), based on a signal from an operating lever(corresponding to the switch SW1) for driving the wiper of a vehicle.

The in-vehicle load control system 100 illustrated in FIG. 1 is assumed to be configured such that the in-vehicle electronic control unit (ECU1) 10 is placed near the driver's seat, and that the in-vehicle electronic control unit (ECU2) 20 is placed at a vehicle rear portion. However, the positional relation therebetween can be altered, if necessary. For example, one of the in-vehicle electronic control units may be placed in a vehicle door, while the other in-vehicle electronic control unit may be placed in an engine room.

Hereinafter, features of the above embodiment of the in-vehicle load control system according to the present invention are listed in the following sections [1] to [4] by briefly being summarized.

[1] An in-vehicle load control system (100) configured to controllably drive one or more loads (e.g., a stop lamp 30) on a vehicle according to an input signal output by an operating switch or a sensor (e.g., a stop lamp switch SW1) on the vehicle, the in-vehicle load control system including:
    a first electronic control portion (e.g., an ECU1 10) configured to perform signal processing based on the input signal;
    a second electronic control portion (e.g., an ECU2 20) configured to controllably drive the load;
    a multiplex communication portion (e.g., multiplex signal interfaces 14, 23) configured to enable multiplex communication of information between the first electronic control portion and the second electronic control portion; and a backup signal channel (e.g., a signal line W2) independent of a signal channel (e.g., a LAN cable W3) through which a signal is transmitted in the multiplex communication portion, and configured to input the input signal to the second electronic control portion, wherein the second electronic control portion is configured to refer to a state of an ignition signal of the vehicle; and the second electronic control portion receives a first control signal via the signal channel in the multiplex communication portion and a second control signal via the backup signal channel, and controllably drives the load by preferentially treating the first control signal when the ignition signal is on and by preferentially treating the second control signal when the ignition signal is off.

[2] The in-vehicle load control system according to the configuration [1], wherein the operating switch includes a stop lamp switch configured to operate in response to pressing of a brake pedal of the vehicle, and the load includes a stop lamp configured to be turned on in response to the pressing of the brake pedal of the vehicle.

[3] The in-vehicle load control system according to the configuration [2], wherein the first electronic control portion includes a microcomputer (ii) capable of being brought into a sleep state in which power consumption is reduced when a predetermined condition is met.

[4] The in-vehicle load control system according to the configuration [3], wherein the microcomputer of the first electronic control portion is brought into the sleep state when the ignition signal is off.

What is claimed is:

1. An in-vehicle load control system configured to controllably drive one or more loads on a vehicle according to an input signal output by an operating switch or a sensor on the vehicle, the in-vehicle load control system comprising:

a first electronic control portion configured to perform signal processing based on the input signal;

a second electronic control portion configured to controllably drive the load;

a multiplex communication portion configured to enable multiplex communication of information between the first electronic control portion and the second electronic control portion; and a backup signal channel independent of a signal channel through which a signal is transmitted in the multiplex communication portion, and configured to input the input signal to the second electronic control portion, wherein the second electronic control portion is configured to refer to a state of an ignition signal of the vehicle; and the second electronic control portion receives a first control signal via the signal channel in the multiplex communication portion and a second control signal via the backup signal channel, and controllably drives the load by treating the first control signal when the ignition signal is on and by treating the second control signal when the ignition signal is off.

2. The in-vehicle load control system according to claim 1, wherein the operating switch includes a stop lamp switch configured to operate in response to pressing of a brake pedal of the vehicle, and the load includes a stop lamp configured to be turned on in response to the pressing of the brake pedal of the vehicle.

3. The in-vehicle load control system according to claim 2, wherein the first electronic control portion includes a microcomputer that is brought into a sleep state in which power consumption is reduced when a predetermined condition is met.

4. The in-vehicle load control system according to claim 3, wherein the microcomputer of the first electronic control portion is brought into the sleep state when the ignition signal is off.

* * * * *